United States Patent
Pathak

(10) Patent No.: US 6,747,630 B2
(45) Date of Patent: Jun. 8, 2004

(54) METHOD TO UP-SAMPLE FREQUENCY RICH IMAGES WITHOUT SIGNIFICANT LOSS OF IMAGE SHARPNESS

(75) Inventor: Bharat Pathak, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/210,404

(22) Filed: Jul. 31, 2002

(65) Prior Publication Data

US 2004/0021424 A1 Feb. 5, 2004

(51) Int. Cl.$^7$ ................................................ G09G 5/00
(52) U.S. Cl. ..................... 345/127; 348/581; 315/366
(58) Field of Search ..................... 315/169.3, 169.2, 315/366, 169.1; 345/125–130, 660; 348/441, 446, 581; 382/156, 298, 300

(56) References Cited

U.S. PATENT DOCUMENTS

| | | |
|---|---|---|
| 4,602,273 A | 7/1986 | Carlson |
| 5,355,328 A | 10/1994 | Arbeiter et al. |
| 5,737,101 A | 4/1998 | Ito |
| 5,900,881 A * | 5/1999 | Ikedo .......................... 345/426 |
| 5,923,789 A | 7/1999 | Avinash |
| 5,995,682 A | 11/1999 | Pawlicki et al. |
| 6,084,568 A | 7/2000 | Premi et al. |
| 6,281,873 B1 * | 8/2001 | Oakley ........................ 345/127 |
| 6,353,459 B1 | 3/2002 | Yeh et al. |
| 6,600,495 B1 * | 7/2003 | Boland et al. .............. 345/660 |

* cited by examiner

*Primary Examiner*—Wilson Lee
(74) *Attorney, Agent, or Firm*—April M. Mosby; Wade James Brady, III; Frederick J. Telecky, Jr.

(57) ABSTRACT

A bi-cosine filter having a scaling technique to process images for up-scaling that does not lead to loss of the high frequency content of the generated image nor leads to image artifact known as waxing and waning is disclosed. The two tap filter (100) includes an input node (102) coupled to receive the image data. A first multiplier (104) couples to receive a first coefficient ($C_0$) and the image data input. The first multiplier (104) multiplies the image data input by the first coefficient ($C_0$) to provide a first product. The image data input is feed through a delay element (106) to delay the image data by a predetermined time period. Delay element (106) connects to a second multiplier (108) that couples to receive a second coefficient ($C_1$). The second multiplier (108) multiplies the time-delayed image data by the second coefficient ($C_1$) to provide a second product. A summer (110) sums the first and second products of the first and second multiplier (104, 108) to provide this sum as a pixel data output at output node (112).

14 Claims, 1 Drawing Sheet

METHOD TO UP-SAMPLE FREQUENCY RICH IMAGES WITHOUT SIGNIFICANT LOSS OF IMAGE SHARPNESS

FIELD OF THE INVENTION

The present invention relates to processing digital images, and, more particularly, to an apparatus and method of up-sampling frequency rich images without significant loss of image sharpness.

BACKGROUND OF THE INVENTION

Flat panel displays within computing systems have gained popularity over conventional CRT monitors due to several enhanced features, including cost efficiency, low weight, decreased dimensions, low energy consumption, improved contrast ratios and improved viewing angles, among others. Each pixel of the image displayed on a flat panel display can be controlled independently through row and column drivers, making the flat panel display more akin to a digital circuit. Thus, a digital signal sent by the computing system to the flat panel display does not need to be converted to analog to be displayed on a flat panel display. Elimination of a digital-to-analog converter (DAC) contributes to the efficiency and performance of a flat panel display. Furthermore, flat panel displays include large bandwidth to display images with clarity.

Flat panel displays include various defining characteristics. The first defining characteristic, pixel dimension, is represented in width by height (X×Y). Computing systems include graphics controllers which provide image data at all pixel dimensions or image sizes which may include anyone of the following industry standards, including, VGA (640× 480), SVGA (800×600), XGA (1024×768), SXGA (1280× 768) and UXGA (1600×1200), where width by height (X×Y) represents each pixel dimension. Another defining characteristic is image resolution which refers to the number of pixels displayed per unit length of the image given in pixels per inch (ppi). It determines the area occupied by the images in conjunction with the pixel dimension. When comparing two images having the same pixel dimension, the one with the higher image resolution will occupy a smaller area if printed. Display resolution, a third defining characteristic, on the other hand, is the fixed resolution that the computer monitor can display in dots per inch (dpi). Most CRT monitors have a display resolution of 96 dpi and flat panel displays presently have a display resolution of 110 or 123 dpi. In many graphics programs, image pixels are translated directly into monitor pixels. Flat panel displays have fixed resolution; whereby, when a flat panel display is manufactured, it is designed to display images for one particular resolution. This resolution is known as the native resolution of the flat panel display possibly due to physical pixel size and display size limitation.

In digital image processing, during the acquisition of an image, some graphic controllers use compression or down-sampling to actually delete pixels to make a graphic file format smaller. The image data is later up-sampled by adding pixel information through the use of an interpolation algorithm. Problems arise when, for example, an image having a pixel dimension of 640×480 is acquired by a flat panel display having a pixel dimension of 800×600 and a display resolution of 110 dpi. The image that is displayed will only occupy 64% of the flat panel screen. Since it is preferable to view the image on the entire screen, this approach is not desirable. Hence, an image is best displayed if the image sent by the graphic controller matches the pixel dimension and display resolution of the flat panel. For this reason, the image must be up-sampled to enlarge the image such that the image fills the entire display screen.

Changing the pixel dimensions of the image by resampling or up-sampling may occur in either software or hardware. Pixel information is added to an image when it is up-sampled through the use of an interpolation algorithm. Given a constant image resolution, up-sampling will produce a larger image. A software solution may be advantageous due to its ability to enable the computer system to process large amounts of images and, yet, have the flexibility of operating on the entire image line data, which is possible due to the presence of an on-board frame buffer using approximately 6 MB of RAM memory in some systems. The greatest disadvantage, however, is that the software solution does not produce images in real time. Furthermore, the software solution requires excessive amounts of processing power to complete the operation. Hence for applications like motion picture videos, the software solution would require an inordinate amount of processing capability. One exception to this disadvantage is if the software provides pixel or line replication, which requires no processing at all. Pixel replication, however, produces jagged blocks which can be visually seen.

Hardware solutions produce images in real time; however, there is limited processor and memory space available for this type of solution. Hence, the flexibility of processing the entire image is not available. As a result, several lines of the image data must be stored. To eliminate the use of excessive processor and memory space, several forms of interpolation may be implemented in hardware to provide pixel "padding" to be inserted in the image data.

Nearest neighbor based image interpolation inserts extra pixels that are the same value as the neighboring pixel. In this technique the edges are preserved, thus retaining high frequency content, where high frequency content may include vertical or horizontal closely spaced lines or text. The largest disadvantage of this type of scaling, however, is that it leads a image artifact called "waxing and waning," where some lines appearing thicker than others.

Bilinear interpolation is a scaling technique in hardware that provides a form of weighted averaging between the nearest two input pixels to provide the value of a padded pixel to be inserted in the image. This weighted averaging is based on the linear distance of the output pixel position from the input pixel position. This type of scaling gives better results than nearest neighbor interpolation. Bilinear interpolation, however, leads to significant loss of the high frequency content in the generated image due to the performance of weighted averaging. Loss of the high frequency content of the generated image leads to blurring of the image.

High resolution cubic convolution and cubic spline interpolation are other forms of resampling techniques that are widely used for digital image processing. These methods, however, generate objectionable image artifacts for images having high frequency content.

Thus, there exists a need for a scaling technique in hardware that will up-sample frequency rich images without significant loss of image sharpness. In addition, there exists a need for a filter having a scaling technique to process images for up-scaling that does not lead to image artifact known as waxing and waning.

SUMMARY OF THE INVENTION

To address the above-discussed deficiencies of up-scaling, hardware filtering techniques, the present invention teaches a bi-cosine filter having a scaling technique to process images for up-scaling that does not lead to loss of the high frequency content of the generated image. The two tap bi-cosine filter 100 includes an input node 102 which receives the image data. A first multiplier 104 couples to receive the first coefficient $C_0$ and the image data input. The image data input is feed through a delay element 106. Delay element 106 connects to a second multiplier 108 that couples to receive the second coefficient $C_1$. The output from the first and second multiplier, 104 and 108 couple to a summer 110 to provide a pixel data output at output node 112.

Advantages of this design include a filter having a scaling technique to process images for up-scaling that does not lead to loss of the high frequency content of the generated image but also to a filter having a simple, and cost effective design. The design does not lead to image artifact known as waxing and waning.

BRIEF DESCRIPTION OF THE DRAWINGS

For a more complete understanding of the present invention and the advantages thereof, reference is now made to the following description taken in conjunction with the accompanying drawing in which like reference numbers indicate like features and wherein.

DETAILED DESCRIPTION OF PREFERRED EMBODIMENTS

Figure 1:
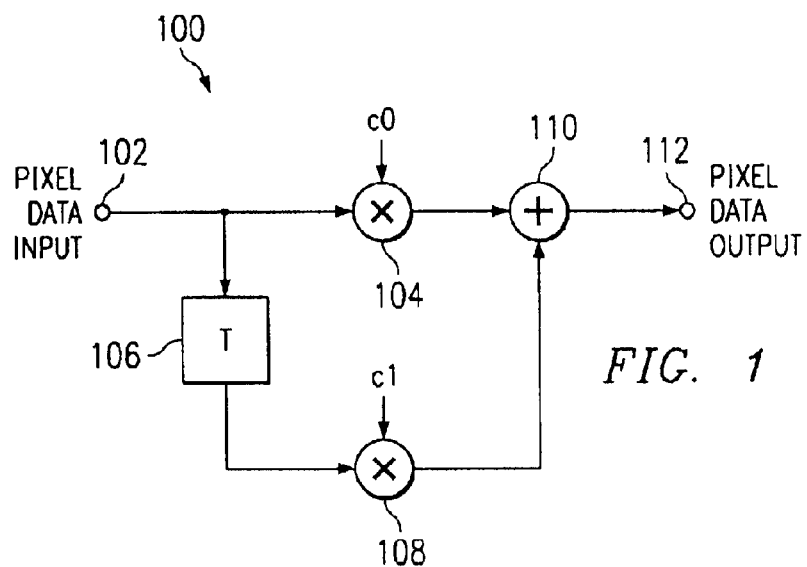
FIG. 1 illustrates bi-cosine filter in accordance with the present invention.

FIG. 1 illustrates the filter in accordance with the present invention. Filter 100 is a two tap bi-cosine filter which only requires one output line of storage. Filter 100 includes an input node 102 coupled to receive the image data. A first multiplier 104 couples to receive the first coefficient $C_0$ and the image data input. First multiplier 104 generates the product of the first coefficient $C_0$ and the image input data. The image data input is feed through delay element 106 to delay the image data by a predetermined time period. Delay element 106 connects to a second multiplier 108 that couples to receive the second coefficient $C_1$. Second multiplier 108 generates the product of the second coefficient $C_1$ and the time-delayed image input data. The output from the first and second multiplier, 104 and 108, couple to a summer 110 where the products output from the first and second multiplier, 104 and 108, are summed to provide pixel data output at output node 112.

The equation for the output of two tap interpolation or scaling is:

$$\text{outpix}(j) = C_0 * \text{inpix}(i) + C_1 * \text{inpix}(i-1);$$

where outpix(j) represents the output pixel at the $j^{th}$ position, inpix(i) represents the input pixel at the $i^{th}$ position, inpix(i−1) represents the input pixel time delayed by one, the first coefficient, $C_0$, equals $[\cos((x)(\pi)/2)][\cos((x)(\pi)/2)]$, the second coefficient, $C_1$, equals $[\sin((x)(\pi)/2)][\sin((x)(\pi)/2)]$, and x is the fractional position of the output pixel with respect to the input pixel. Integer i=0, 1, 2, ... n where n is the number of pixels in the image input. Interger j=1,2,3, ... m where m is the number of pixels in the output image.

Since color zone plate contains a large amount of high frequency content, the color zone plate becomes a natural choice as an acid test for comparing different scaling algorithms. As a result of testing, the bi-cosine algorithm based image up-sampling produces significantly better results than nearest neighbor, bilinear, high-resolution cubic convolution and cubic spline interpolation based image scaling.

Figure 2:
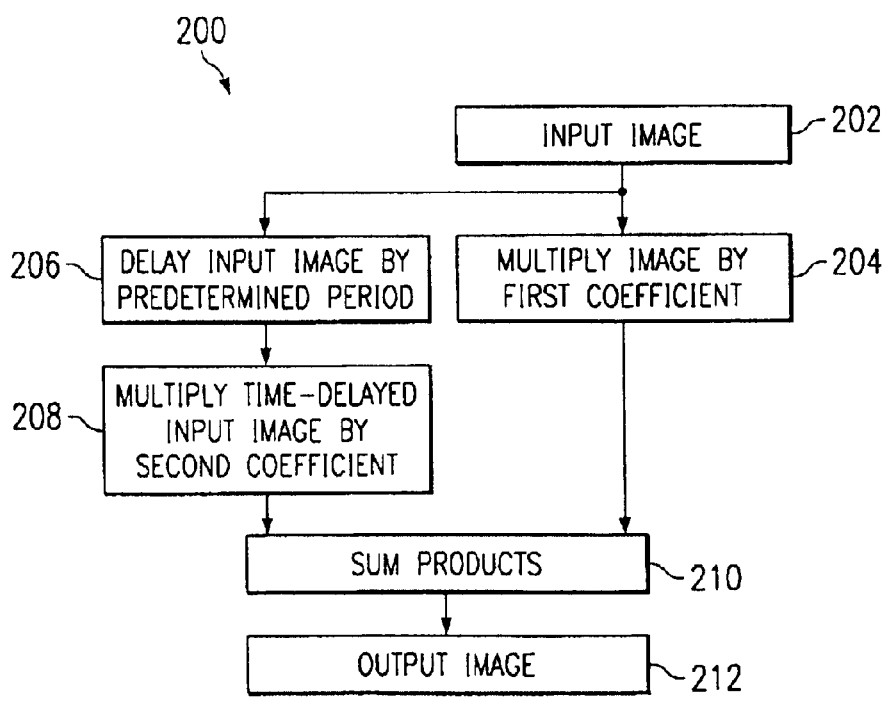
FIG. 2 illustrates a flow chart of the method of filter image data input for up-sample scaling in accordance with the present invention.

FIG. 2 represents the method of bi-cosine scaling using a two tap filter. Step 202 the image is input into the computer system. Step 204 multiplies the input image by the first coefficient, $C_0$, which equals $[\cos((x)(\pi)/2)][\cos((x)(\pi)/2)]$ to produce a first product. Step 206 delays the input image by a predetermined time period. Accordingly, in step 208, the time-delayed input image is multiplied by a second coefficient, $C_1$, which equals $[\sin((x)(\pi)/2)][\sin((x)(\pi)/2)]$ to generate a second product. The first and second products are summed in step 210. This sum is provided as an output image in 212.

The bi-cosine method of up-sampling scaling of images is not only applicable for flat panel applications but may be used effectively in any application that requires image enlargement in either the vertical or horizontal direction in real time where limited resources are available.

Those of skill in the art will recognize that the physical location of the elements illustrated in FIG. 1 can be moved or relocated while retaining the function described above.

Advantages of this design include a filter having a scaling technique to process images for up-scaling that does not lead to loss of the high frequency content of the generated image but also to a filter having a simple, and cost effective design. The design does not lead to image artifact known as waxing and waning.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A two tap bi-consine filter having an input and output node, to generate a two tap interpolation at the output node, the input node coupled to receive image input data, the filter comprising:

a first multiplier coupled to receive the image input data from the input node and coupled to receive a first coefficient $C_0$ to multiply the image input data by the first coefficient $C_0$ and produce a first product;

a delay element coupled to receive the image input data from the input node to produce a time-delayed image input data by a predetermined time delay;

a second multiplier coupled to receive the time-delayed image input data and coupled to receive a second coefficient $C_1$ to multiply the time-delayed image input data by the second coefficient $C_1$ and produce a second product; and a summer coupled to the first and second multipliers to sum the first and second products of the first and second multipliers, respectively, and provide a sum at the output node, wherein the output node provides an output image comprising a plurality of output pixels outpix(j) equal to:

$$\text{outpix}(j) = C_0 * \text{inpix}(i) + C_1 * \text{inpix}(i-1)$$

where outpix(j) represents an output pixel at the $j^{th}$ position, inpix (j) represents an input pixel of the image input data at the $i^{th}$ position, inpix(i-1) represents an input pixel of the time delayed image input data, i is an integer equal to 0, 1, 2, . . . n where n is the number of pixels in the image input data, j is an integer equal to 1,2,3, . . . m where m is the number of pixels in the output image data.

2. A as recited in claim 1, wherein the first coefficient is equal to:

$$(\cos((x)(\pi)/2))\,(\cos((x)(\pi)/2))$$

where x equals a fractional position of the output pixel with respect to the input pixel.

3. A as recited in claim 1, wherein the second coefficient is equal to:

$$(\sin((x)(\pi)/2))\,(\sin(x)(\pi)/2))$$

where x equals a fractional position of the output pixel with respect to the input pixel.

4. A filter for up-sampling image data, comprising:

a two tap filter coupled to receive the image data to preserve high frequency content of the image data, the two tap filter having a first and a second coefficient, the first coefficient is $$(\cos((x)(\pi)/2))\,(\cos((x)(\pi)/2)),$$

the second coefficient is $$(\sin((x)(\pi)/2))\,(\sin((x)(\pi)/2)),$$

the two tap filter to produce an output image that is equal to a sum of a product of the first coefficient times the image data and a product of the second coefficient times a time-delayed image data.

5. A filter for up-sampling image data, comprising:

a means for sampling the image data having two taps separated in spatial frequency by one predetermined time period;

a multiplying means coupled to each of the taps to multiply the image data of each tap by a coefficient; and a summing means coupled to the multiplying means for summing the outputs thereof in such a manner as to preserve high frequency content of the image data.

6. A filter as recited in claim 5, wherein the first tap is multiplied by a first coefficient equal to:

$$(\cos((x)(\pi)/2))\,(\cos((x)(\pi)/2))$$

where x equals a fractional position of the output pixel with respect to the input pixel.

7. A filter as recited in claim 5, wherein the second tap is multiplied by a second coefficient equal to:

$$(\sin((x)(\pi)/2))\,(\sin(x)(\pi)/2))$$

where x equals a fractional position of the output pixel with respect to the input pixel.

8. A flat panel display unit including filter for up-sampling image data, comprising:

a two tap filter coupled to receive the image data to preserve high frequency content of the image data, the two tap filter having a first and a second coefficient, the first coefficient is $$(\cos((x)(\pi)/2))\,(\cos((x)(\pi)/2)),$$

the second coefficient is $$(\sin((x)(\pi)/2))\,(\sin((x)(\pi)/2)),$$

the two tap filter to produce an output image that is equal to a sum of a product of the first coefficient times the image data and a product of the second coefficient times a time-delayed image data.

9. A flat panel display unit including filter for up-sampling image data, comprising:

a means for sampling the image data with two taps separated in spatial frequency by one predetermined time period;

a multiplying means coupled to each of the taps to multiply the image data of each tap by a coefficient; and a summing means coupled to the multiplying means for summing the outputs thereof in such a manner as to preserve high frequency content of the image data.

10. A flat panel display unit as recited in claim 9, wherein the first tap is multiplied by a first coefficient equal to:

$$(\cos((x)(\pi)/2))\,(\cos((x)(\pi)/2))$$

where x equals a fractional position of the output pixel with respect to the input pixel.

11. A flat panel display unit as recited in claim 9, wherein the second tap is multiplied by a second coefficient equal to:

$$(\sin((x)(\pi)/2))\,(\sin((x)(\pi)/2))$$

where x equals a fractional position of the output pixel with respect to the input pixel.

12. A real-time image processing method comprising the steps of:

a. multiplying the image input data by a first coefficient $C_0$ in a first multiplier to generate a first product;

b. delaying the image input data by a first predetermined time delay;

c. multiplying the delayed image input data by a second coefficient $C_1$ in a second multiplier to generate a second product; and d. summing the first and second product of the first and second multipliers to provide image output data, wherein the output node provides the image output data comprising a plurality of output pixels outpix(j) equal to:

$$\text{outpix}(j) = C_0 * \text{inpix}(i) + C_1 * \text{inpix}(i-1)$$

where outpix(j) represents an output pixel at the $j^{the}$ position, inpix(i) represents the input pixel of the image input data at the $i^{th}$ position, inpix(i-1) represents an input pixel of the time delayed image input data, i is an integer equal to 0, 1, 2 . . . n where n is the number of pixels in the image input data, j is an integer equal to 1,2,3, . . . m where m is the number of pixels in the image data.

13. The method as recited in claim 12, wherein the first coefficient is equal to:

$$(\cos((x)(\pi)/2))\,(\cos((x)(\pi)/2))$$

where x equals a fractional position of the output pixel with respect to the input pixel.

14. The method as recited in claim 12, wherein the second coefficient is equal to:

$$(\sin((x)(\pi)/2))(\sin(x)(\pi)/2))$$

where x equals a fractional position of the output pixel with respect to the input pixel.

* * * * *